MULTICHANNEL CARRIER TELEPHONE SYSTEM

Filed Dec. 29, 1951 11 Sheets-Sheet 1

INVENTORS R. S. CARUTHERS
E. K. VAN TASSEL
BY Charles Baraff
AGENT

INVENTORS R. S. CARUTHERS
E. K. VAN TASSEL
BY
Charles Baraff
AGENT

Nov. 30, 1954 R. S. CARUTHERS ET AL 2,695,927

MULTICHANNEL CARRIER TELEPHONE SYSTEM

Filed Dec. 29, 1951 11 Sheets-Sheet 3

INVENTORS R. S. CARUTHERS
E. K. VAN TASSEL
BY Charles Baraff
AGENT

INVENTORS R. S. CARUTHERS
E. K. VAN TASSEL
BY Charles Baraff
AGENT

MULTICHANNEL CARRIER TELEPHONE SYSTEM

Filed Dec. 29, 1951

INVENTORS R. S. CARUTHERS
E. K. VAN TASSEL
BY
Charles Baraff
AGENT

MULTICHANNEL CARRIER TELEPHONE SYSTEM

Filed Dec. 29, 1951 11 Sheets-Sheet 6

INVENTORS R. S. CARUTHERS
E. K. VAN TASSEL
BY Charles Baraff
AGENT

INVENTORS R. S. CARUTHERS
E. K. VAN TASSEL
BY
Charles Baraff
AGENT

Nov. 30, 1954 R. S. CARUTHERS ET AL 2,695,927

MULTICHANNEL CARRIER TELEPHONE SYSTEM

Filed Dec. 29, 1951 11 Sheets-Sheet 8

INVENTORS R.S. CARUTHERS
E.K. VAN TASSEL

BY Charles Baraff

AGENT

INVENTORS R. S. CARUTHERS
E. K. VAN TASSEL
BY Charles Baraff
AGENT

Nov. 30, 1954 R. S. CARUTHERS ET AL 2,695,927

MULTICHANNEL CARRIER TELEPHONE SYSTEM

Filed Dec. 29, 1951 11 Sheets-Sheet 10

INVENTORS R. S. CARUTHERS
E. K. VAN TASSEL
BY
Charles Baraff
AGENT

INVENTORS R. S. CARUTHERS
E. K. VAN TASSEL
BY Charles Baraff
AGENT

United States Patent Office 2,695,927

Patented Nov. 30, 1954

2,695,927

MULTICHANNEL CARRIER TELEPHONE SYSTEM

Robert S. Caruthers, Mountain Lakes, and Earl K. Van Tassel, Westfield, N. J., assignors to Bell Telephone Laboratories, Incorporated, New York, N. Y., a corporation of New York Application December 29, 1951, Serial No. 264,098

28 Claims. (Cl. 179—15)

This invention relates to multichannel carrier systems for two-way communication.

Short-haul carrier systems for use in a single cable, preferably one carrying numerous paralleling voice frequency circuits, have been heretofore disclosed in the United States applications of R. S. Caruthers, Serial No. 176,036, filed July 26, 1950, and Serial No. 176,037, filed July 26, 1950. Such short-haul multichannel carrier systems employ transmitted carrier double sideband transmission and are characterized by the use of different frequency bands for the two directions of transmission. At each repeater, "frequency-frogging" or the successive interchange of the high and low frequency bands involved in the two-way transmission is accomplished by frequency band shifting modulators. Concomitant with the "frequency-frogging", there is produced at the first and subsequent repeaters an inversion in the order of channels. Compandors are built into the individual channel units of the system to minimize noise and cross-talk and to relax the performance requirements of repeaters, modulators, etc., and to make the filter selectivity requirements throughout the system less stringent.

A need has arisen to supply additional telephone circuits to the many communities served by open-wire facilities. Heretofore, carrier systems on open-wire lines have been constructed primarily for long circuits, 200 to 2000 miles or more. An economical short-haul carrier system for distances less than 50 to 100 miles has been a desideratum particularly for transmitting many channels on single open-wire pairs to save copper and the lead required for the laying of new cables without concomitantly sacrificing high quality and reliability.

An object of the invention is to provide a low-cost multichannel carrier system on open-wire lines without sacrificing quality.

Another object of the invention is to eliminate waste frequency space in a multichannel carrier system on open-wire lines by utilizing single sideband transmission and twin-channel operation.

Another object of the invention is to allocate the signaling frequencies of the system so that they are removed from the common carrier sufficiently to be undisturbed by clicks and other low frequency disturbances in the vicinity of the carrier.

A feature of the invention is a twin-channel terminal utilizing the upper and lower sideband to provide a pair of channels on a single carrier frequency.

Another feature is a four-channel bank comprising a pair of twin channels for each direction of transmission which will operate as a group and employ common group modulators, amplifiers, band filters, etc.

Another feature of the invention is the modulation, demodulation, and regulation of a twin channel by the single carrier common thereto.

Another feature of the invention is a built-in compandor for each channel and ferrite filters whose nonlinearity is rendered tolerable by the compandor advantage in decibels at various filtering points of the multichannel system.

Another feature of the invention is the use of high Q ferrite band filters as directional filters permitting very close spacing of opposite directional groups with very flat transmission.

In accordance with a particular embodiment of the invention disclosed herein, a two-way short-haul multichannel carrier system is provided for open-wire lines utilizing twin-channel operation with single sidebands.

The upper and lower sidebands of a single carrier modulated by different subscribers' signals provide the two channels for the twin-channel operation.

A group of four channels is provided comprising a pair of twin channels with their carriers spaced eight kilocycles apart and the regulation of a twin channel is by the common carrier associated therewith. The carrier is transmitted at a reduced level with the sidebands. At the receiving terminal, the carrier is enhanced to serve as a regulator pilot for the two channels as well as the common demodulating carrier frequency.

The opposite directions of transmission have separate frequency bands individual thereto designated as high group band and low group band, respectively. Frequency-frogging repeaters which include built-in modulators interchange high and low group bands and concomitantly invert the channel order or sequence. As a result, the system is able to dispense with cross-talk, suppression filters, or longitudinal coils at repeater points. Inversion of the channel order in the respective high and low frequency bands makes the system self-equalizing so that no slope equalizing or regulating networks are needed in repeaters or terminal group units.

Referring to the figures of the drawing:

Fig. 1A is a flow chart to illustrate schematically two-way carrier telephone transmission and reception by high and low frequency bands representing four channels of speech in accordance with the invention.

Figure 1A:
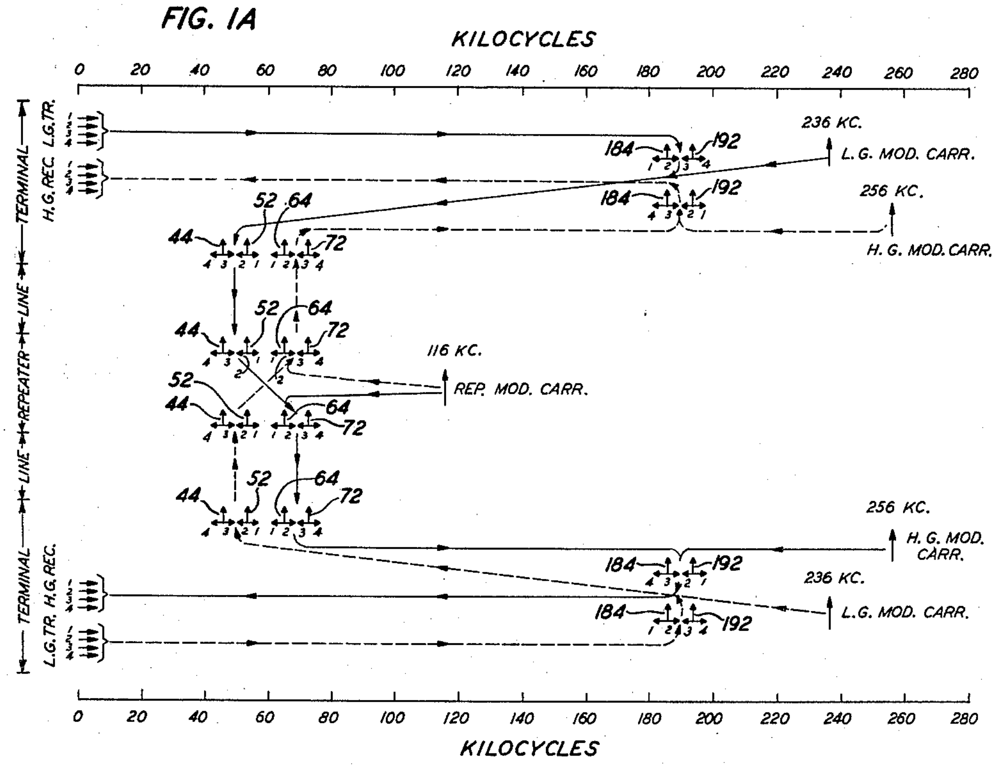
Fig. 1A is a flow diagram showing four-channel operation of a multi-channel carrier system in accordance with the invention.

Starting at the lower terminal LGTR and following the dotted line flow in the indicated direction, four channels 1, 2, 3, 4 are shown as arrows which are transposed from the voice frequency range as four speech channels into the 180–196 kilocycle range. This transposition is accomplished by modulation with twin carriers of 184 kilocycles and 192 kilocycles, respectively. One of the two sidebands resulting from this modulation is suppressed in each case. The upper and lower sidebands, respectively, of a single carrier, i. e., 184 kilocycles, for example, thus provide two single sidebands each representing a different speech channel. The other carrier, i. e., 192 kilocycles, provides the other two separate channels. The pair of channels is hereinafter referred to as a twin channel.

To obtain the low frequency group for propagation over the line and through the repeaters, the 180–196 band is modulated with the low group modulating carrier of 236 kilocycles, as represented by the oblique dotted line to give the 40–56 kilocycle band.

The four channels now situated in the 40–56 kilocycle low band pass over a section of line and enter the repeater. In the passage through the repeater, the low frequency band is converted to a high frequency band 60–76 kilocycles, and the channel order is inverted. The 116 kilocycle modulator at the repeater is responsible for this so-called "frequency-frogging."

After transmission over any desired number of line sections and intervening repeaters either in the low frequency group of 40–56 kilocycles or in the high frequency group of 60–76 kilocycles, the four contained channels are received at the remote terminal designated H. G. Rec. At this upper terminal, a high group modulating carrier of 256 kilocycles transposes the group to the 180–196 kilocycle range whence the four channels are recovered by demodulation as four received speech messages.

The opposite direction of transmission is delineated by the solid lines. Starting from the upper terminal, the four channels can be similarly traced through the system until their reception in the lower terminal.

The terminals are arranged to transmit either low or high group frequencies. A low group transmitting terminal (LGT) transmits the low group (40–56 kilocycles) and receives the high group (60–76 kilocycles). Conversely, a high group transmitting terminal (HGT) transmits the high group and receives the low group.

The use of a low group 40–56 kilocycles and a high group 60–76 kilocycles permits transmission in both directions on a single line pair, and the frequency-frogging at repeaters, i. e., the interchange of these low and high frequency bands, overcomes the serious interaction cross-talk that would otherwise occur in the channels.

Because of the interchange of frequency bands in the frogging repeaters, repeater outputs at the same repeater point are always in one frequency group and repeater inputs in the other group. The interaction cross-talk is then between equal level points and, as a result, longitudinal suppression coils and filters can be dispensed with.

It is evident from Fig. 1A that in the terminals, regardless of whether the low group 40–56 kilocycles is transmitted or received with coincident transmission or reception of high group 60–76 kilocycles, respectively, the channel frequencies occupy the 180–196 kilocycle band in identical frequency position with only the order number of the channels reversed. This permits use of channel band filters, passing the single sideband of speech desired, in modulation and demodulation that are identical in design for channels 1 and 4. Identical design can also be used for the filters of channels 2 and 3. This radical reduction in numbers of filter designs is one of the features of the invention that results when combining twin-channel operation with a frequency-frogging system.

Figure 1B:
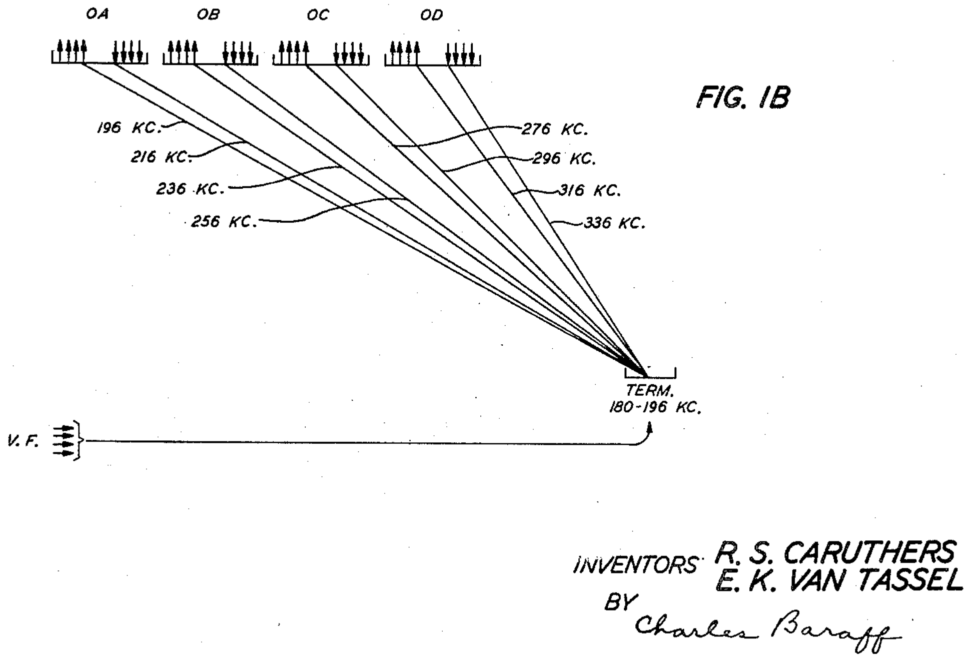
Fig. 1B is a flow diagram showing the frequency allocation of several four-channel groups on an open-wire line.

Fig. 1B is a flow diagram indicating how plural four-channel groups may be shifted to line frequencies in accordance with the invention to provide blocks of 8, 16, 32 one-way channels for propagation over open-wire lines with a minimum of waste in frequency space and with relative freedom from interchannel cross-talk and the like.

The OB block, described in connection with Fig. 1A, provides four two-way telephone channels on open-wire line pairs in the frequency band of 40–76 kilocycles. The OA, OC, OD carrier systems are similar in structure, and each provides four-channel groups for two-way transmission whose allocation in the frequency range is determined by the low and high group modulating carriers associated therewith and represented by the oblique lines. Thus, in the case of the OA system, the line frequencies extend up to 36 kilocycles and are derived from the same terminal frequencies (180–196 kilocycles) as in the OB. The corresponding high and low group carrier frequencies are 196 kilocycles and 216 kilocycles.

Above the OB range, the OC carrier system utilizes high and low group carriers of 276 kilocycles and 296 kilocycles and the common 180–196 kilocycle terminal frequencies to provide blocks of four channels, as shown in the line frequency range of 80–116 kilocycles. Similarly, the OD carrier system is allocated to the range of 120–156 kilocycles, i. e., above OC on the open-wire line. This frequency allocation leaves four kilocycles between each group in which the various groups can be separated.

*General introduction*

Figure 1C:
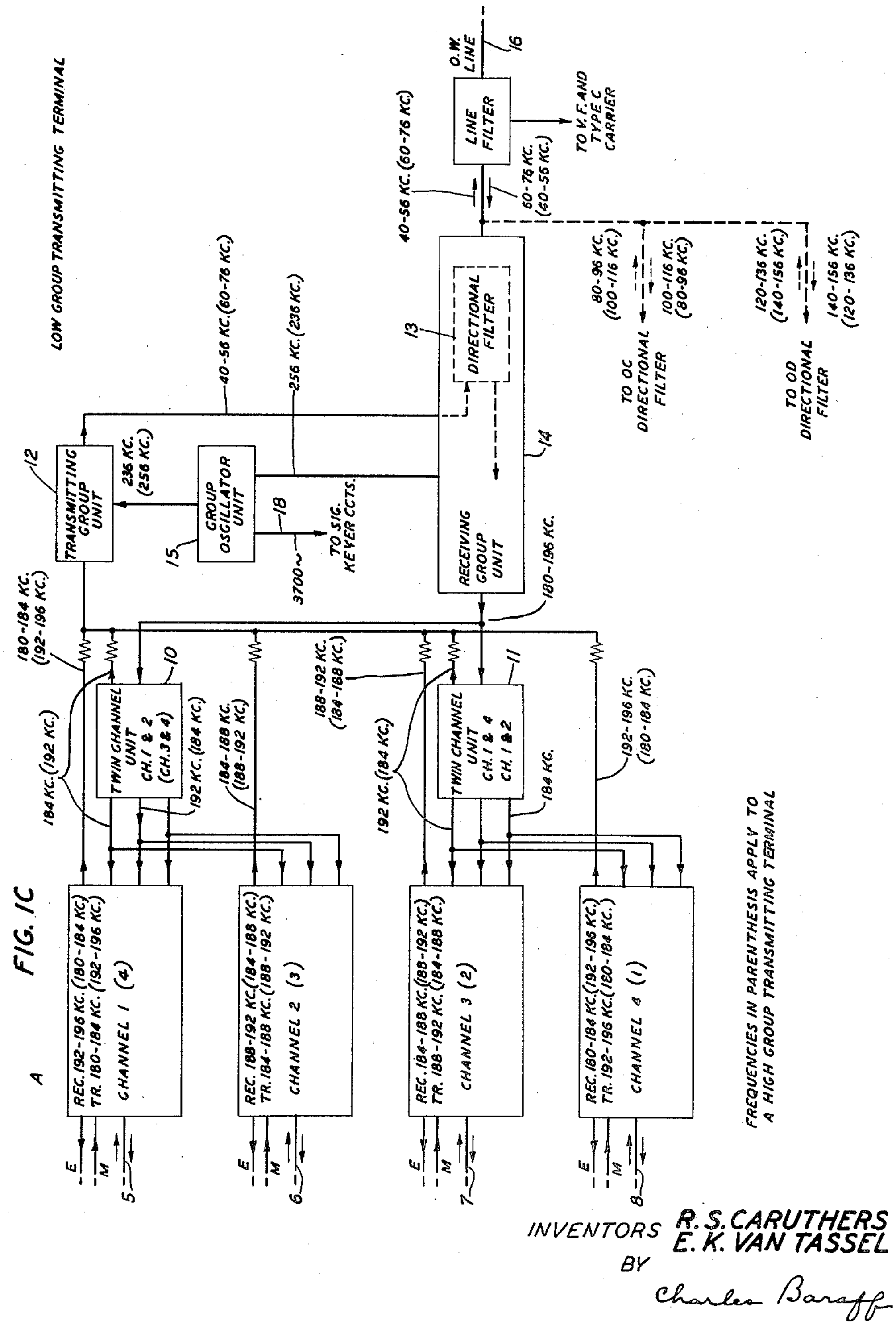
Fig. 1C is a block schematic of a carrier terminal in accordance with the invention.

Referring to Fig. 1C, the carrier terminal A comprises four channel units 1, 2, 3, and 4 connected to four separate speech circuits 5, 6, 7, and 8 and the associated signal leads E and M for the transmission of either dialing or supervisory information over the carrier system.

Four single sideband carrier channels are generated at terminal A by causing each voice channel to modulate one of two carriers at 184 kilocycles and 192 kilocycles in balanced modulators, and by using a band filter following each channel modulator to reject the unwanted sideband. The four channels are then combined in twin-channel pairs (upper and lower sidebands of each of the two carriers), together with resupplied carriers, and the resulting 180–196 kilocycle band modulated to line frequencies by group modulation with a 236 kilocycle carrier if the terminal employs low group transmitting (LGT) or with a 256 kilocycle carrier if high group transmitting (HGT) is used. In either case, a band filter selects the lower sideband to give line frequencies of 40–56 kilocycles for the low group and 60–76 kilocycles for the high group.

The twin-channel carrier unit 10 furnishes carrier for the channel modulator in a pair of channels 1 and 2 and supplies the reinforced carrier for demodulators in the same channels, one carrier always being at 184 kilocycles and the other at 192 kilocycles. Since the system is of single sideband type, one channel passes the upper sideband of the carrier while the other passes the lower. The twin-channel unit 10 also supplies the transmitted carrier for the channels 1 and 2. On the receiving side, the twin unit provides regulation for the associated pair of channels. A similar twin-channel carrier unit 11 is provided for channels 3 and 4 also utilizing frequencies at 184 kilocycles and 192 kilocycles but with transmitting and receiving frequencies reversed from those of twin-channel carrier unit 10.

The four transmitted channels and the two transmitted carriers, i. e., 184 kilocycles and 192 kilocycles, respectively, are combined and applied to the transmitting group unit 12 where a group modulator of 236 or 256 kilocycles transforms the group of frequencies to the proper location in the frequency spectrum for application to the open-wire line 16. The four-channel group is applied to the line in the frequency band of 40–56 kilocycles for a low group transmitting terminal (LGT) and 60–76 kilocycles for a high group transmitting terminal (HGT), as illustrated, the latter case utilizing a group modulator carrier of 256 kilocycles.

The transmitting group unit 12 also provides amplification for application of the channels to the open-wire line 16 at the proper levels. Before application to the line, the four-channel group is passed through a directional filter 13 located for compactness in the receiving group unit 14.

Speech messages are received from the distant terminal A′ over the open-wire line 16 as a 60–76 kilocycle band and passed through a directional filter 13 which is wired to be appropriate for either an HGT or LGT terminal. Group modulation with oscillator 15 (256 kilocycles or 236 kilocycles) restores the received channel frequency bands to the proper frequency location of 180–196 kilocycles for passage through the twin-channel units 10, 11 and the channel filters in said channel units. The receiving group unit 14 also provides amplification and regulation on a group basis. The regulator operates over a wide range of levels sufficient to assure commercial channel performance for wet or sleet line conditions. The group regulator is supplemented by the twin-channel regulator. The twin regulator is principally effective during severe line conditions and sudden or rapid changes in line and terminal attenuation of moderate amplitude. Also, the twin regulator provides moderate compensation for lack of flatness in equalization and regulation of the group regulator, as it controls gain of only two of the channels.

The group oscillator unit 15 provides the 236 and 256 kilocycle oscillator supplies required by the group modulators aforementioned. In addition, a 3700-cycle oscillator 18 provides the channel units with a frequency which is used to transmit signaling information over the system.

The manner of connecting other blocks of four channels in various frequency ranges, as previously disclosed in Fig. 1B, is shown by dotted lines indicating connections to the OC and OD directional filters for the 80–96 kilocycle band and 120–126 kilocycle band, respectively.

Figure 2A:
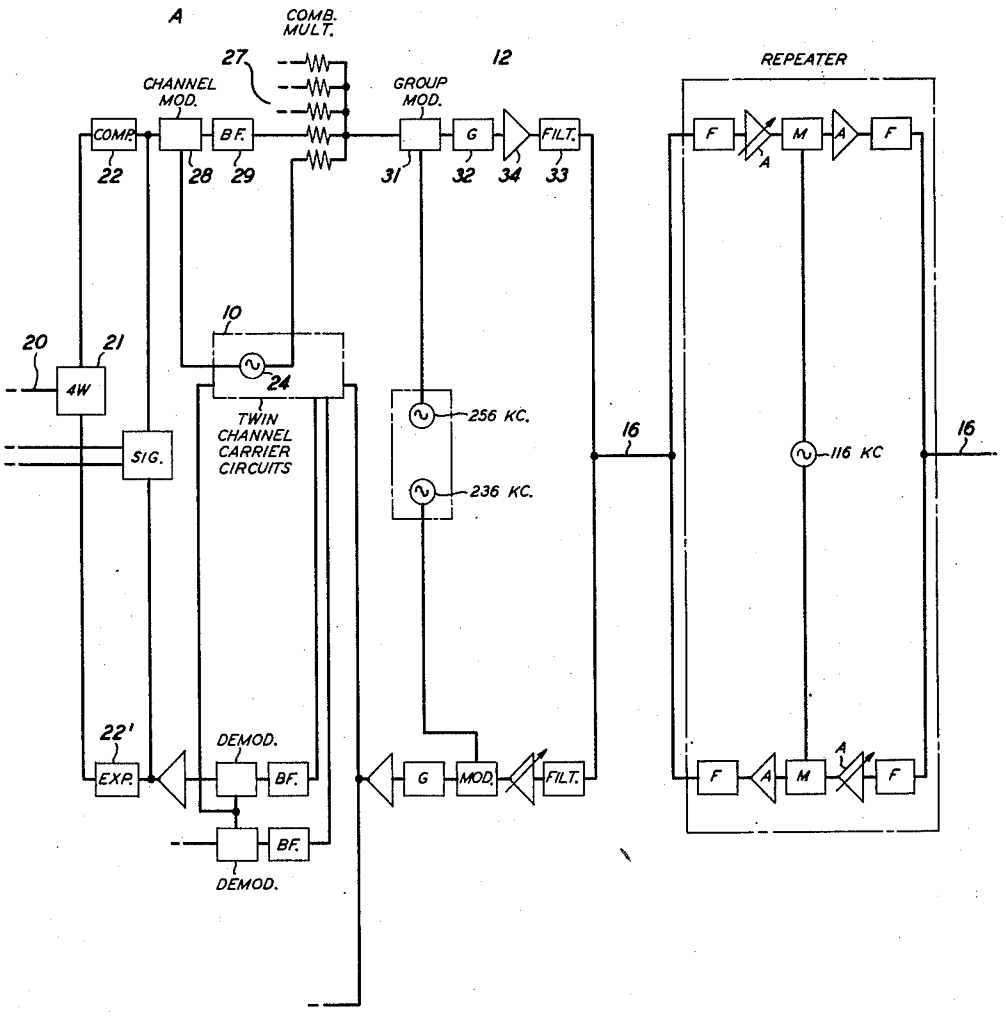
Figs. 2A and 2B illustrate a schematic of a two-way multichannel carrier system in accordance with the invention.
Figure 2B:
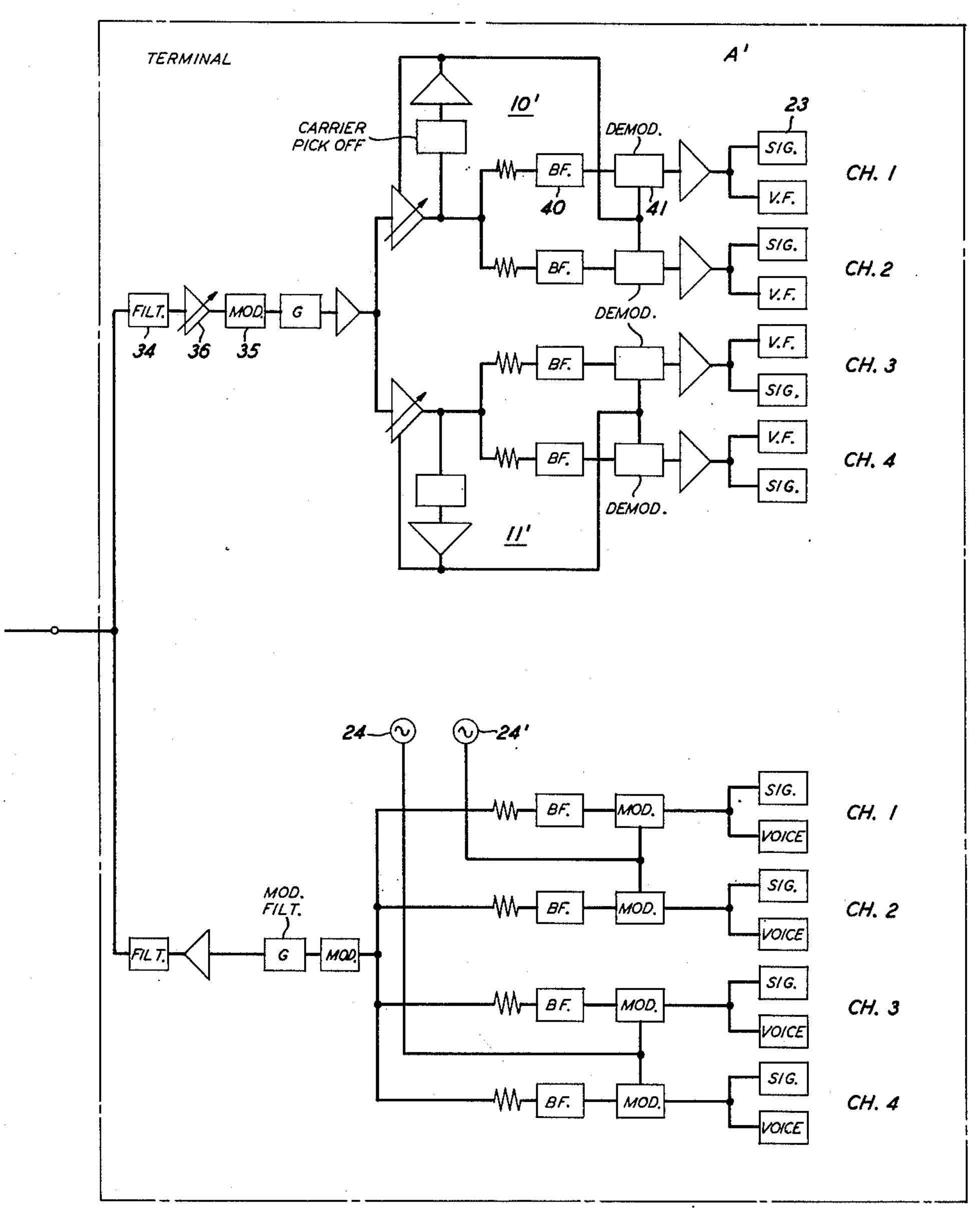

Figs. 2A and 2B jointly show a multichannel carrier system in accordance with the invention including terminals, open-wire line and repeaters shown schematically.

To simplify the description, it should be noted that the compressor, expandor, or compandor circuits shown in Figs. 2A and 2B are described in greater detail in the aforementioned applications of R. S. Caruthers, and the signaling circuit is more fully described therein and in the United States application of F. S. Entz, G. A. Pullis, R. E. Ressler, R. O. Soffel, and L. A. Weber, Serial No. 175,898, filed July 26, 1950.

Speech currents from the associated trunk circuit 20 are passed through a repeating coil into a variolosser and amplifier which are components of the compressor circuit 22. A portion of the amplifier output is rectified in the compressor control circuit to produce direct current which varies in magnitude as the syllabic energy in the speech varies. This current flows through the varistor elements in the variolosser to change its loss and hence the overall compressor gain. The compressor, by this action, reduces the range of speech power at its output to approximately one half of that applied to its input.

Figure 3A:
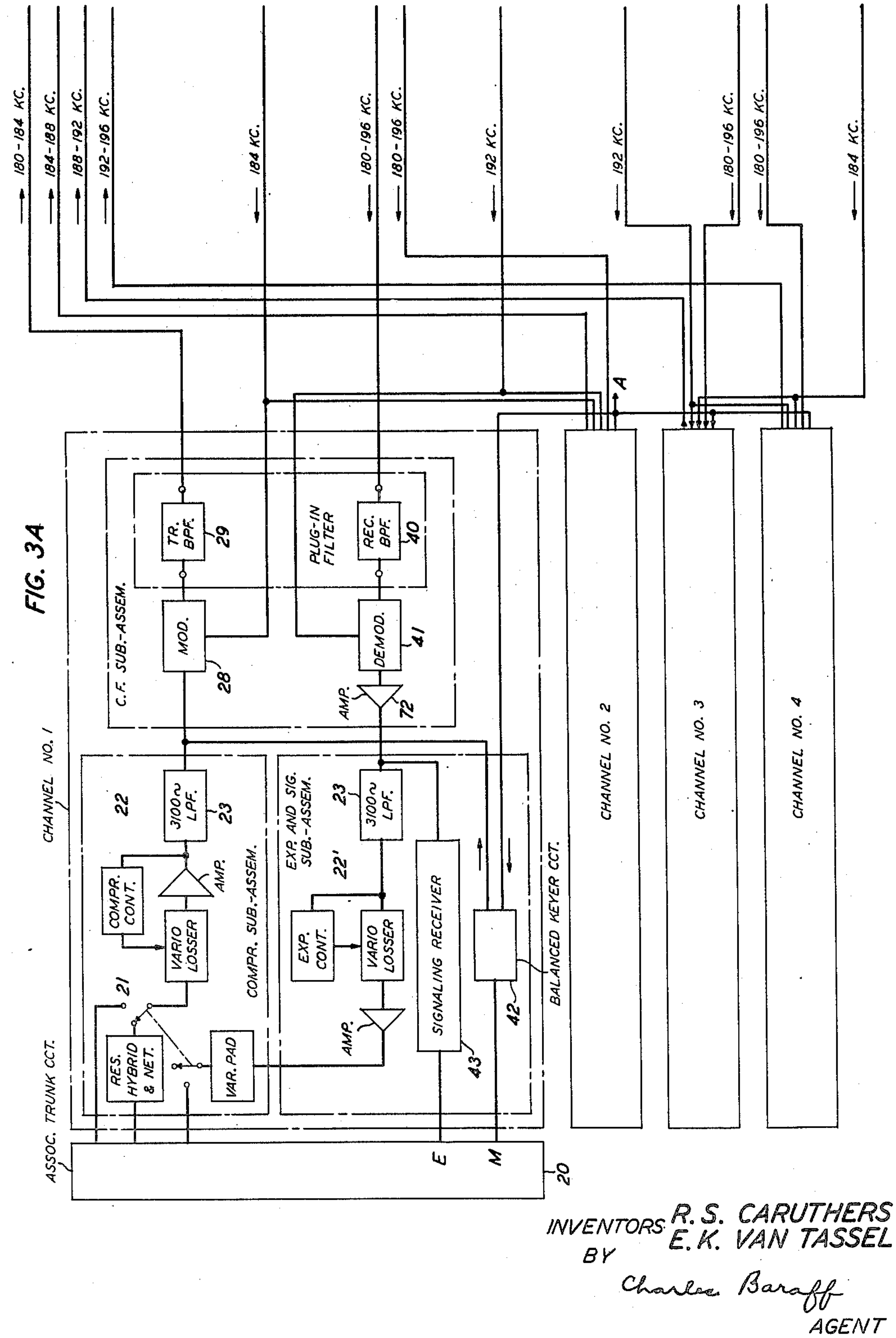
Figs. 3A and 3B illustrate a more detailed schematic of the terminal circuits in accordance with the invention.

Following the compressor amplifier, speech currents are applied to the channel modulator 28 after passing through a transmitting low pass filter shown in Fig. 3A, which has a cut-off at 3100 cycles. Frequencies above 3100 cycles are likely to be contained in the compressor-amplifier output either due to their presence in the transmitted speech or due to their generation in the output stage because of its limiting action. One purpose of the filter is to block the passage of frequencies around 3700 cycles in order to prevent interference with the operation of the signaling circuit. It also serves to attenuate frequencies above 4000 cycles which could cause objectionable cross-talk in adjacent carrier channels 2, 3, and 4.

Referring to Figs. 2A and 3A, the balanced-shunt type channel modulator 28 which modulates the voice frequencies with a frequency of 184 kilocycles or 192 kilocycles also balances the carrier out of its output. This modulator receives its carrier supply from the associated twin-channel carrier unit 10 where the carrier oscillator 24 is located. At the output of the modulator 28, the transmitting channel bandpass filter 29 selects the wanted sideband, for example, the lower sideband (180–184 kilocycles) from one of the channel units. For an associated channel unit, the upper sideband (184–188 kilocycles) is selected by a corresponding channel filter. The common carrier frequency supplied by the oscillator 24 for these associated channel units is at 184 kilocycles. Thus, one carrier (e. g., 184 kilocycles) has an upper sideband derived from one speech message and a lower sideband derived from a different speech message.

A combining multiple 27 brings together the filtered single sidebands of the four-channel modulators and the two transmitted carriers from unit 10 for application to the input of the transmitting group circuit 12.

In the transmitting group circuit 12 (Fig. 2A), the group of four speech sidebands and two transmitted carriers is first shifted in frequency to either the low or high group of line frequencies (40–56 kilocycles or 60–76 kilocycles) in a double balanced modulator 31 by means of a 236 kilocycle LG carrier or 256 kilocycle HG carrier, respectively. A group bandpass filter 32 selects the desired group of sideband frequencies, which are then amplified to the proper level for transmission over the line 16. The group passes through a directional filter 33 before the transmitted signal currents reach the open-wire line 16 through appropriate line circuits, as shown more fully in Fig. 3B.

*Filters and ferrite coils*

The channel band filter 29 is a compact unit employing a piezoelectric crystal and a ferrite core inductor; the directional filter 33 and other filters, such as filter 40, in the terminal group circuits and filters in the repeaters have no crystals but contain as many as ten ferrite core inductors.

Briefly, the cores of these inductors are a mixture of ferrites providing both high permeability and high resistivity.

In one practical embodiment, a ferrite comprising a mixture of magnetic and non-magnetic oxides, such as $FeO_2$, $MnO_2$, or $NiO_2$, $ZnO_2$, having high permeability was used in the open-wire carrier system disclosed. The ferrite is molded under high pressure and fired to form several parts. The coil is formed and enclosed in the core parts which are then cemented together. The coil is thus enclosed in a ferrite shell with a closed magnetic path so that cross-talk to associated circuits is at a minimum. A coil occupying less than 1½ inch cube can be made for use at carrier frequencies having a "quality factor" Q well over 500 with low eddy current loss and low copper loss. The winding, being formed before assembly, is economical to make and assemble. The ferrite is not affected by humidity. An inductance variable sufficient for manufacturing adjustment of the filter is obtained by mechanically changing the air-gap in the core.

The built-in compandor 22, 22' for each channel shown in Figs. 2A and 3A makes feasible the use of the numerous ferrite inductors involved in the multichannel carrier system. Without the advantage in decibels provided by the compandor, the non-linearity and resulting intermodulation introduced by the magnetic core inductors would be intolerable from the viewpoint of cross-talk and noise. However, the combination of compandor advantage and ferrite inductor results in high quality performance superior to that produced by linear systems.

A compandor consists of a compressor plus an expandor. The compressor compresses the input speech volumes by raising the weak speech levels so that weak speech is transmitted at a considerably higher than normal level over the intervening line between the terminals. Thus, weak speech gains with respect to any noise, intermodulation, or cross-talk interferences existing on the line. The strongest of the speech signals being already strong enough to over-ride all of the various interferences do not need any further increase in level in the compressor. In fact, the very strong signals may be even slightly lowered and thus benefit amplifier loading, etc. In the expandor, the speech volumes are expanded to their original range at the compressor input by lowering the weak speech levels and again leaving the highest speech levels unchanged. In the absence of speech, the compressor provides a gain of about 28 decibels and the expandor a corresponding 28 decibels loss, so that all interferences to the listener are reduced 28 decibels when speech is not being received. Effectively, not quite this full advantage is obtained in practice as far as speech signal-to-noise ratio is concerned. The net results of this are manyfold; in addition to line benefits, repeater spacings can be longer, selectivity requirements of all filters whether in lines or terminals are eased considerably, higher system output levels can be tolerated without prohibitive modulation effects, and lower repeater input levels can be tolerated without excessive noise.

The four-channel group transmitted from terminal A (Fig. 2A) is propagated over a pair of wires 16 constituting the carrier transmission line. The transmission line is provided with repeaters spaced at intervals of 50 to 100 miles. At each repeater, the high and low groups (Fig. 2C) are "frogged", that is, interchanged, and the channel order inverted in the manner disclosed in the United States application of R. S. Caruthers, Serial No. 176,036, filed July 26, 1950.

This frogging equalizes the line slope characteristic in successive sections, requires a repeater gain equal to the line loss at the cross-over frequency rather than at the maximum line frequency. It reduces interaction cross-talk via other wires on the line by transmitting the high level output signals in a different frequency band from the low level input signals of another repeater at the same location.

A detailed description of the repeater circuits involving the E–W amplifier and W–E amplifier is presented subsequently in connection with Fig. 4.

*Receiving circuits*

Figures 2C, 3B:
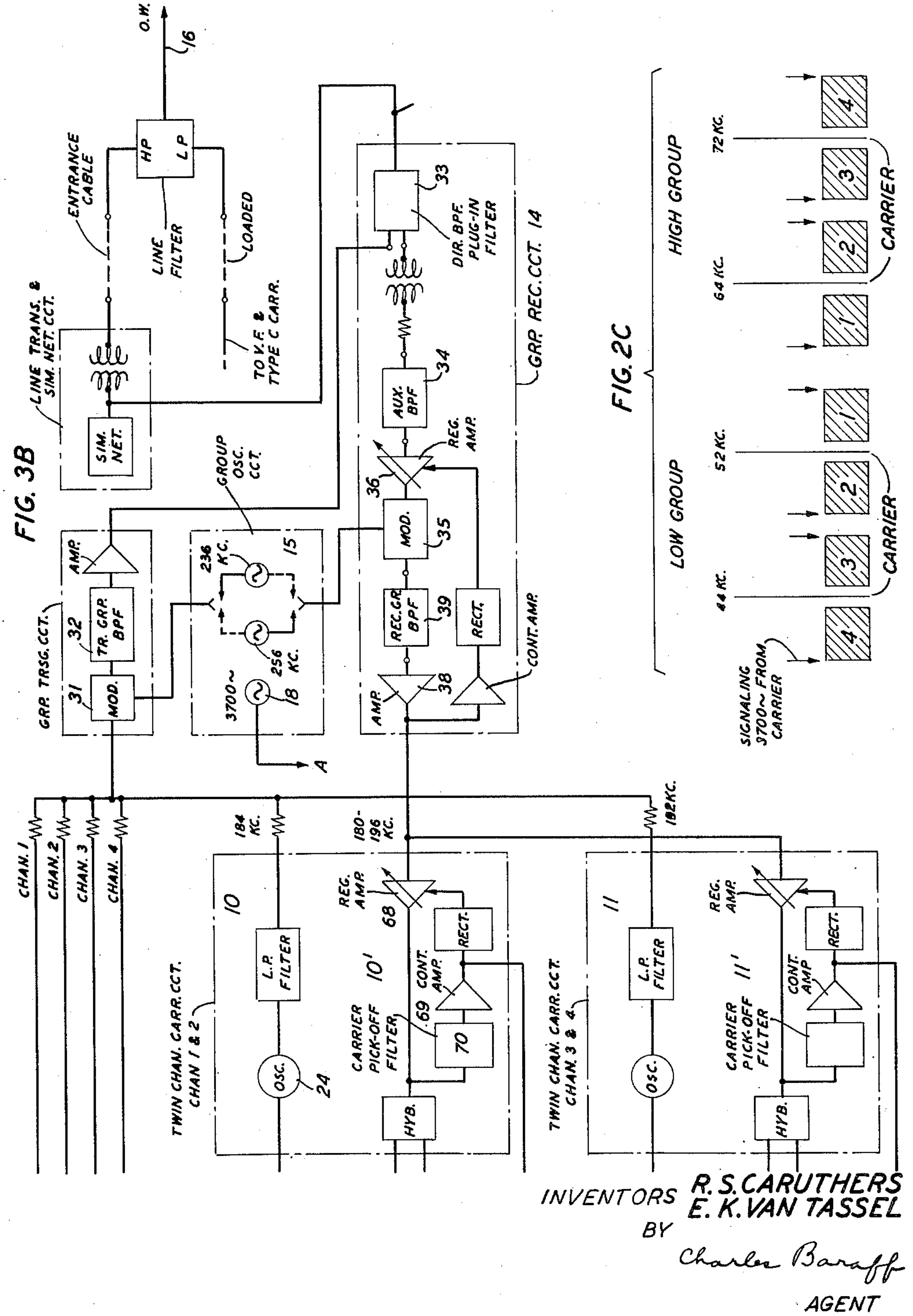
Fig. 2C is a twin-channel frequency allocation chart.

Referring to Figs. 2B and 3B, the four-channel group transmitted from the terminal A after passing over the carrier line 16 reaches the distant terminal A' (Fig. 2B), where a directional filter provides separation between the transmitted and received frequency bands. Additional selection of the wanted frequency groups (40–56 kilocycles or 60–76 kilocycles) is provided by the auxiliary filter 34 following the directional filter in the receiving group circuit. The received four-channel group is regulated (as described below), modulated by group modulator 35 to the channel frequencies (180–196 kilocycles), and amplified before being applied to the twin-channel carrier receiving circuit 10′ (Fig. 2B). The group regulation by amplifier 36 under control of the total power, in the four speech channels and the two transmitted carriers, provides a flat gain change to compensate for line loss variations resulting from changing weather conditions (dry or wet weather or sleet).

The four-channel group including two carriers coming out of the receiving group circuit is then applied to the input of the receiving branches of both twin-channel units 10′, 11′, where a second stage of regulation takes place, each subgroup of two channels being regulated under control of the received carrier of the particular subgroup.

The various speech sidebands are then selected by their respective receiving channel band filters 40, etc. (Figs. 2B and 3A), in the carrier frequency subassemblies of the channel units, applied to the channel demodulator 41, which is supplied with carrier obtained from the twin-channel units 10, 10′ and converted back to voice frequencies.

Following demodulation, speech currents are passed through a receiving low pass filter 23′ located on the expandor-signaling subassembly. The filter blocks from the expandor and the message circuit output all signaling circuit currents and 8-kilocycle tone resulting from beats between adjacent channel carriers.

The expandor 22′ (Fig. 3A) is a forward-acting device as contrasted with the compressor which is backward acting; i. e., the loss of the expandor is controlled by the speech power at the forward or input end while the compressor loss is controlled by the power at the backward or output end. Circuit-wise, the compressor and expandor variolossers are controlled by similar speech currents since their control circuits are both effectively connected to parts of the circuit where the speech volume range is compressed. The compressed speech currents enter the control circuit of the expandor to produce direct current whose magnitude varies as the syllabic energy of the speech varies. This direct current flows through the varistors in the variolosser to alter its loss and hence the overall expandor transmission. The performance of the expandor variolosser is opposite to that of the one in the compressor circuit so that speech currents are restored to their original relative volumes. The variolosser is followed by a fixed gain amplifier.

*Signaling*

The signaling circuit 42—43 (Fig. 3A) functions through controlled interruptions of a 3700-cycle tone in each channel. For supervisory type of use, the on and off periods of the tone are relatively long while in the case of dialing, the information is transmitted in the form of short spurts. The signals are transmitted over the system with a minimum of distortion in order to assure reliable performance. The signaling circuit used in this carrier system is of the type disclosed in the Entz et al. application aforementioned.

Supervisory or dial pulse direct-current signals, which are alternatively —48 volts and ground, are applied from the trunk circuit 20 to the "M" lead of the channel unit. As indicated in Fig. 3A, the keyer circuit 42 is connected to a 3700-cycle signaling source 18 located in the group unit 15. Germanium varistors in the keyer circuit are conditioned to have either high loss when —48 volts is connected to the "M" lead or low loss when ground is applied. Thus, 3700 cycles are transmitted to or blocked from the modulator input, dependent on the presence of ground or —48 volts, respectively, on the "M" lead. From the input of the modulator, the signal follows the transmission path already described in connection with speech transmission. The signal tone at the modulator output consists of the 3700-cycle sideband frequencies, one of which is selected by the channel bandpass filter 29.

Figure 5A:
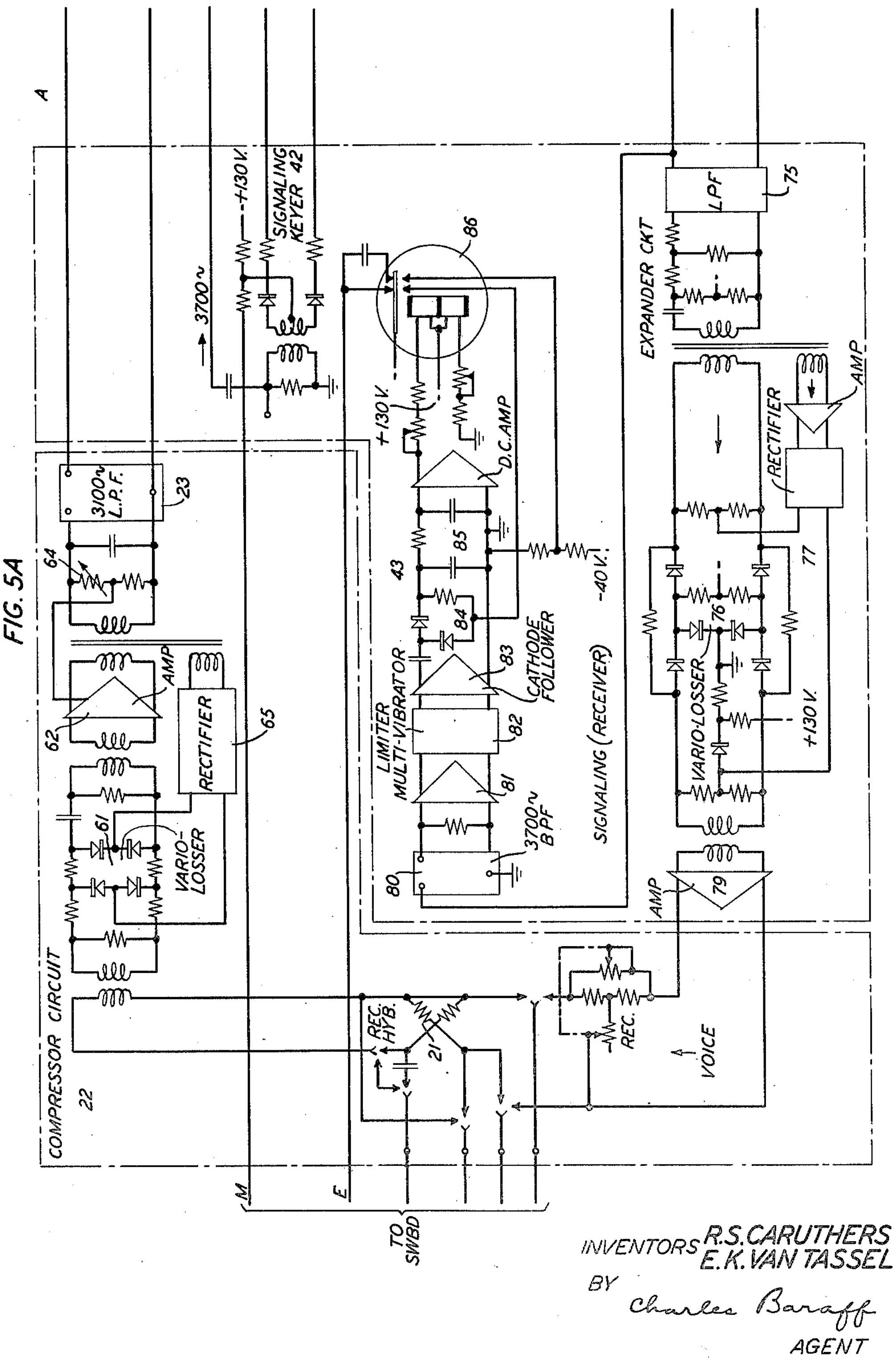
Figs. 5A and 5B show the detailed circuits of a carrier terminal in accordance with the invention.

At the receiving end of the circuit, the signaling sideband is selected and demodulated in the same manner as is the speech sideband. The 3700-cycle signal at the output of the demodulator 41 is passed through a narrow bandpass filter (3700 cycles) in the signaling circuit, which provides protection against interference from message frequencies and 8-kilocycle intercarrier beat. The 3700-cycle signal is then passed through signal receiver 43 comprising an amplifier stage adjusted for proper gain and a limiter-multivibrator (Fig. 5A). The multivibrator converts the 3700-cycle sine waves of varying amplitude to 3700-cycle square waves of relatively constant amplitude, making the signaling circuit insensitive to changes in level at the demodulator output, as more fully described in the aforementioned Entz et al. application and in the R. S. Caruthers application, Serial No. 176,036. The 3700-cycle square waves of signaling tone then pass through a cathode follower to a voltage doubler rectifier. The direct-current signals or pulses at the rectifier output pass through a delay circuit which makes the circuit inoperative on short duration interferences caused by the line hits or noise bursts. Following the delay circuit, the direct-current signals are amplified and caused to control a sealed mercury contact polarized relay which produces the proper openings and closures of ground on the "E" lead to the associated trunk circuit 20 (see Fig. 5A).

*Line repeaters*

Figure 4:
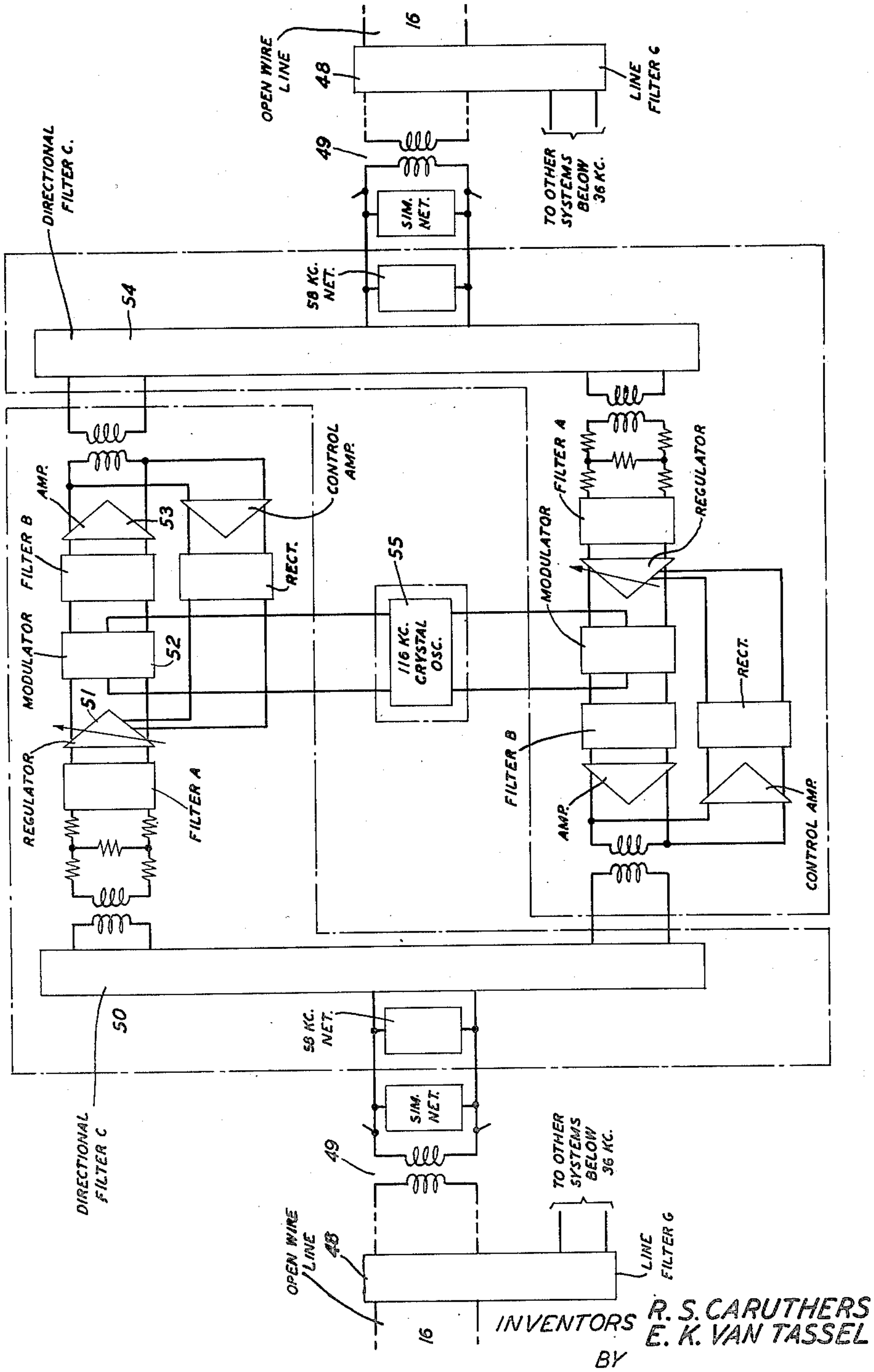
Fig. 4 shows a repeater of the aforementioned multichannel carrier system.

Fig. 4 shows the two-way line repeaters in block schematic form. The repeater performs four basic functions. It separates the two groups of frequencies used for the two directions of transmission on the open-wire line, translates and inverts the incoming group by modulation to the opposite group; amplifies the signals and transmits them to the line; and automatically regulates the repeater gain to compensate for changes in line loss.

Frequency-frogging carrier repeaters are employed to transmit the speech and signals of the four-channel group along the open-wire pairs on an equivalent four-wire basis. Different groups of frequencies (40–56 kilocycle low group and 60–76 kilocycle high group) are employed for the two directions of transmission, each repeater performing the important functions of frequency-frogging and frequency inversion in addition to regulation and amplification, as more fully disclosed in the aforementioned applications of R. S. Caruthers, Serial Nos. 176,036 and 176,037, filed July 26, 1950.

Referring to Fig. 4, the incoming carrier currents from the open-wire line 16 pass through the line filter 48 and line transformer 49. The OB frequencies are separated from lower frequencies on the line by filter 48. When OC and OD systems are used on the open-wire line, similar transformers and appropriate line filters may be applied. The line filters 48 employ ferrite coils as inductors and have a sharp cut-off below 40 kilocycles per second.

The directional filters 50, 54 are used on opposite sides of the repeater to pass the desired groups. They present a high impedance to the line outside the pass band, so that three directional filters may be used in parallel for the OB, OC, and OD systems, while maintaining a good impedance facing the line in any particular pass band. The directional filters 50, 54 are identical with each other and with the directional filters of the group receiving circuit (Figs. 5A and 5B) and are described at greater length subsequently in Figs. 7A and 7B.

After passing through the directional filter 50, the wanted band is transmitted to the input auxiliary filter A. In the case of a low-high repeater, filter A passes the 40–56 kilocycles per second band and rejects the 60–76 kilocycles per second band. For a high-low repeater, the converse is true for filter A.

Following the filter A are two stages of regulation 51 which permit the repeater to maintain essentially a constant output level for a wide range of input levels. The regulating amplifier 51 supplies the signals at a constant level to the modulator 52.

In the modulator 52, the input group of frequencies is modulated with the 116 kilocycles per second carrier from the crystal controlled repeater oscillator 55 to translate from low group to high group or vice versa. The modulator 52 is of the double-balanced type which ideally suppresses in its output both the 116 kilocycles per second carrier and the input signals.

The output of the modulator is passed through the filter B, which passes the 60–76 kilocycles per second band, which is then amplified by the line amplifier 53 to the correct level and transmitted through the directional filter 54 to the open-wire line 16.

At the same time that the groups are interchanged by frequency-frogging, the position of the channels within the groups is reversed, i. e., channel 4 is changed from the highest channel in the high group to the lowest channel in the low group, or vice versa. This inversion results in a very nearly constant line loss across the four-channel group for an even number of line sections and thus nearly equilizes the line slope. It also follows that the maximum repeater gain required is that necessary to compensate for the loss at the mean frequency rather than the loss at the highest frequency. The following table shows the equalization of the transmission losses under sleet condition through two repeater sections of 55 miles each of 128-gauge, 8-inch spaced pairs with one-quarter inch ice coating thereon.

TABLE

Transmission through two repeater sections showing equalization of the line loss due to frequency-frogging:

| | Channel 1 | Channel 2 | Channel 3 | Channel 4 |
|---|---|---|---|---|
| DB loss—High Group | 40.2 | 41.3 | 44.7 | 45.9 |
| DB loss—Low Group | 34.7 | 33.6 | 30.5 | 29.4 |
| Total Loss | 74.9 | 74.9 | 75.2 | 75.3 |

The losses shown were measured at 1000 cycles away from the respective carrier frequencies.

If there is an odd number of repeater sections in the system, the final slope will be very nearly that of a system with no repeaters, as the repeaters are primarily flat amplifiers with an automatically varying gain and no slope adjustment.

The repeater output is automatically adjusted by amplifying and rectifying a portion of the output of the line amplifier in the control amplifier and rectifier, comparing this direct-current voltage to a reference direct-current voltage, and supplying the difference to the regulating amplifier stages as bias. A change in repeater output results in a change in regulator bias which causes the regulating amplifier gain to change in such a direction as to offset, largely, the original change in output.

Two types of automatic transmission regulation are employed, group regulation and twin-channel regulation. Both operate largely on the energy contained in the twin-channel carrier frequency. Group regulation is effected in each repeater and in the group receiving unit of the terminal, with the combined energy in the two twin-channel carriers acting as the pilot for automatic adjustment of amplifier gain. At terminals only, following four-channel group regulation, the level of each twin-channel pair is adjusted independently of the other twin pair in one of two twin-channel units. This is accomplished by selecting the proper one of the two twin-channel carriers and using the energy therein to control the gain of the built-in regulating amplifier, as will be more fully explained subsequently.

Figure 5B:
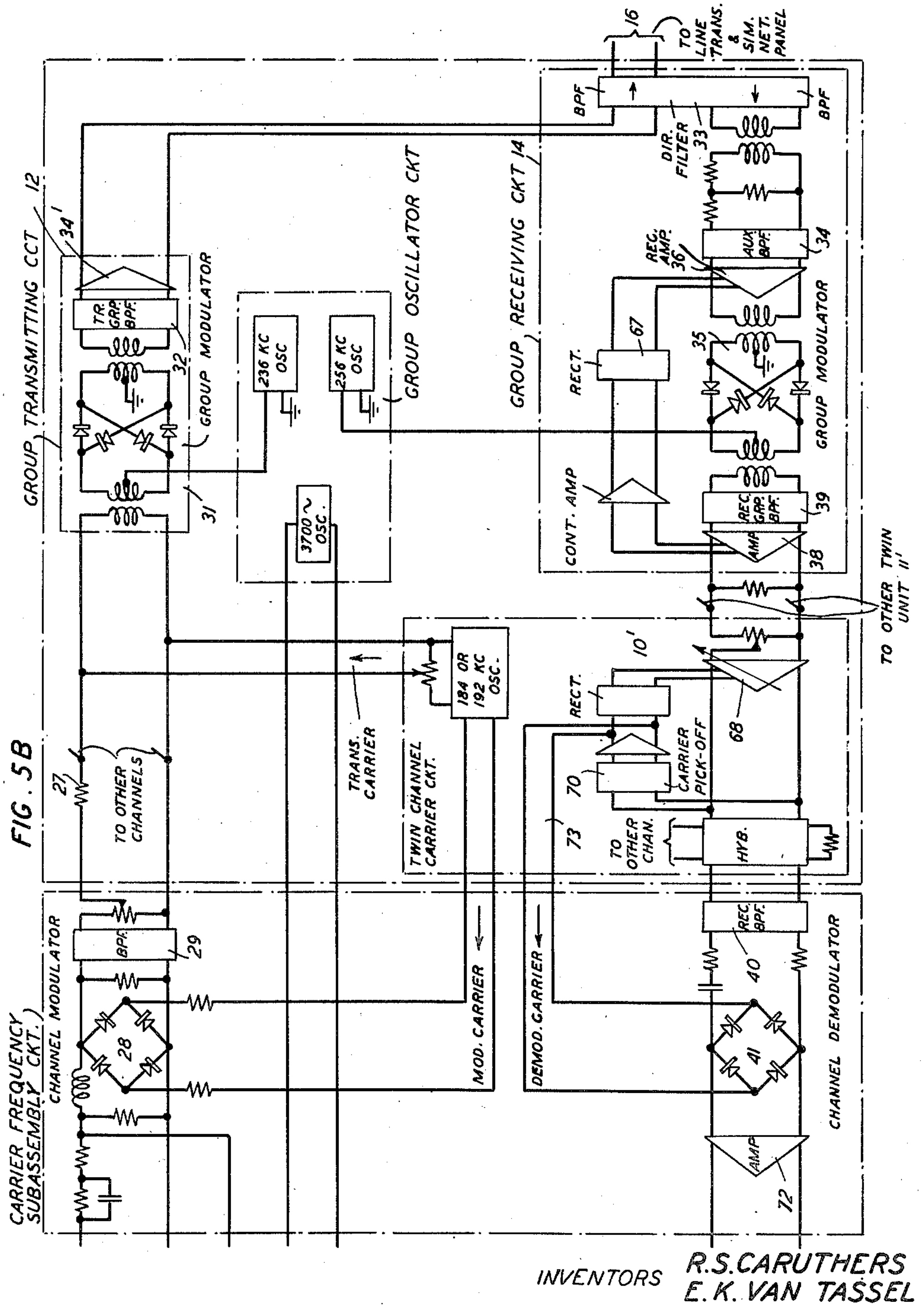

Figs. 5A and 5B show the circuit components of a carrier terminal and their interconnections.

*Compressor*

The compressor circuit 22 receives at its input the voice currents from the switchboard over the four-wire terminating network 21. The voice signals are applied to variolosser 61, thence to amplifier 62 and low pass filter 63. In the compressor 22, the amplitudes of the voice signals are compressed in a 2:1 ratio.

The variolosser 61 is essentially a balanced attenuator, whose loss depends upon the amount of direct current flowing through the germanium varistors in the shunt arms. The direct current which controls the loss is obtained from the rectified output of the compressor amplifier 62 via the control circuit. The action is such that, within operating limits, a 2-decibel change in input produces only a 1-decibel change in output.

The compressor voice frequency amplifier 62 transmits speech currents to the low pass filter 23 and furnishes the power required for driving the rectifier which controls the variolosser attenuation. Feedback is provided for stability and the gain with feedback is 40 decibels. The feedback adjusting potentiometer 54 is used to set the output level for lining up the channel unit. The low pass filter 23 suppresses speech components above 3100 cycles to prevent these from interfering with the signaling circuit.

A part of the compressor amplifier output is rectified by a full-wave rectifier 55 composed of germanium varistors in the control circuit. The resulting direct current, which is made to vary at a syllabic rate with speech amplitude through use of a condenser-resistance time constant circuit, is applied longitudinally to the variolosser to control its loss as required for 2:1 compression.

*Channel modulator*

The compressed speech currents are applied to the channel modulator 28, as are also the 3700-cycle signals from the signaling keyer 42. After channel modulation, these currents are transmitted to the group transmitting circuit via the combining multiple in the terminal as a single sideband at channel frequency.

The channel modulator 28 includes a voice frequency input pad which matches the compressor output impedance to the modulator and a shunt-type balanced varistor modulator 28 where the compressed speech or 3700-cycle signaling tone modulates with the carrier supplied from the carrier oscillator in the twin-channel unit. The transmitting channel band filter 29 rejects the unwanted sideband and gives further suppression to the small amount of carrier leak coming from the modulator due to imperfect balance. Following the filter is a potentiometer (T) which permits adjustment of output power for initial lineup and maintenance. All channel output powers are adjusted to be equal. The modulator operates with either 184 kilocycles or 192 kilocycles carrier which is supplied by an oscillator in the twin-channel carrier circuit.

The space in the carrier frequency spectrum allocated to the output of a channel modulator circuit depends upon the channel number and types of terminal. The channel frequency allocation, both transmitting and receiving, is given in the following table:

| Chan. No. | Filter | LG Terminal | | HG Terminal | |
|---|---|---|---|---|---|
| | | Trans., kc. | Rec., kc. | Trans., kc. | Rec., kc. |
| 1 | A | 180–184 | 192–196 | 192–196 | 180–184 |
| 2 | B | 184–188 | 188–192 | 188–192 | 184–188 |
| 3 | B | 188–192 | 184–188 | 184–188 | 188–192 |
| 4 | A | 192–196 | 180–184 | 180–184 | 192–196 |

Filters A and B refer to the aforementioned channel filter 29.

Figure 6A:
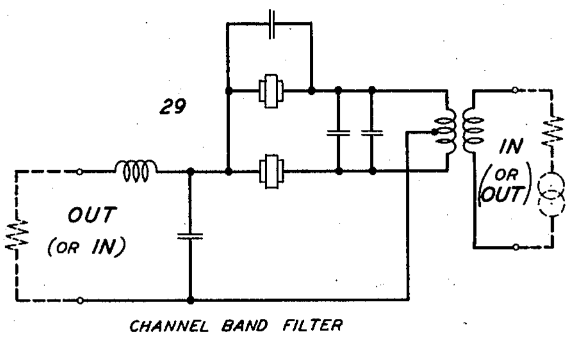
Fig. 6A shows a channel band filter.
Figure 6B:
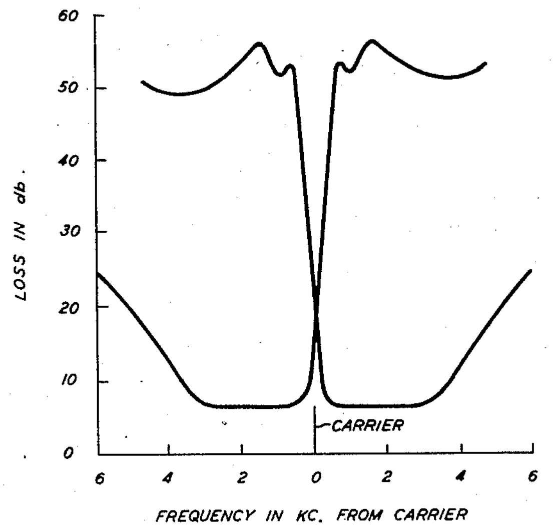
Fig. 6B shows its corresponding frequency characteristic.

The transmitting and receiving band filters for one channel are both contained in one plug-in filter can. The orientation of this can in its socket determines which section is used for transmitting and which is used for receiving. Because of the dual relationship between channels 1 and 4 and between channels 2 and 3 only two channel band filter codes are needed, filter A for channels 1 and 4 and filter B for channels 2 and 3. A channel may be changed from HGT to LGT operation, or vice versa, simply by unplugging its band filter can, rotating it 180 degrees, and plugging it back in. Correct orientation of the filter in its socket is obtained when the visible information on its cover corresponds to the appropriate channel number and type of terminal. A schematic drawing and typical loss-frequency characteristics of the channel band filters are shown in Figs. 6A and 6B. The schematic for only one filter is shown, since both are identical in configuration.

The combining multiple 27 is a resistor, by means of which the four channel sidebands from the channel circuits and the two carriers from the twin-channel carrier circuits are combined for transmission to the input of the transmitting group circuit. The combining multiple 27 provides impedance matching between the transmitting channel band filters 29 and the input of the group transmitting circuit. The combining pad loss between channels is 40 decibels so that the impedance effect of any channel filter upon the transmission of any other channel is negligible.

*Group transmitting circuit*

The group transmitting circuit performs several functions. It shifts the four sidebands and two carriers at the channel frequencies to the line frequencies either 40–56 kilocycles for LGT on 60–76 kilocycles for HGT. It amplifies them to obtain the proper line level.

The carrier is 256 kilocycles for HGT and 236 kilocycles for LGT. No change is necessary in the group transmitting circuit when changing a terminal from LGT to HGT or vice versa. The transmitting group low pass filter 32 is wide enough to take care of the low group and high group line frequencies (and in addition the line frequencies of OC and OD carrier). The carrier frequency supplied to the modulator by the group oscillator circuit is either at 236 kilocycles or 256 kilocycles.

*Group modulator*

The output of the combining multiple is applied to the group modulator 31. It is the double balanced type consisting of a copper oxide varistor connected between repeating coils, wherein the carrier and the input signal are balanced out of the output.

*Group transmitting filter*

The group transmitting filter 32 passes the group of four channels as a lower sideband produced by the modulator, to which it is connected, and rejects all other products. The filter 32 transmits frequencies up to 160 kilocycles, which covers the line frequencies of the OB, OC, and OD systems.

The output of filter 32 is applied to the transmitting amplifier 34′, which is a two-stage feedback amplifier using pentode tubes. The frequency characteristic of the amplifier 34′ is approximately flat from 40–196 kilocycles.

The output of the group transmitting circuit 12 is applied to the directional filter 33 and thence to the open-wire line 16.

Figure 7A:
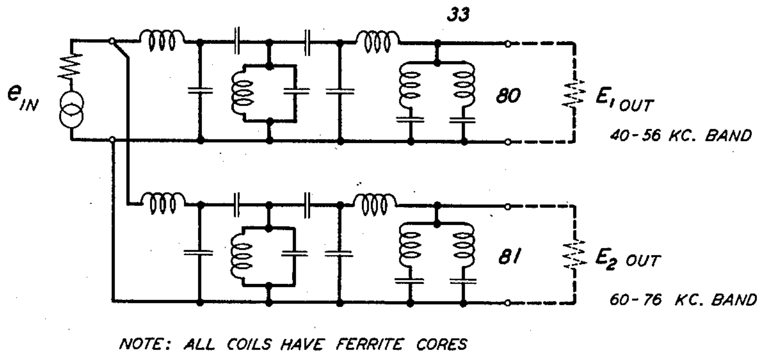
Fig. 7A shows a directional filter.
Figure 7B:
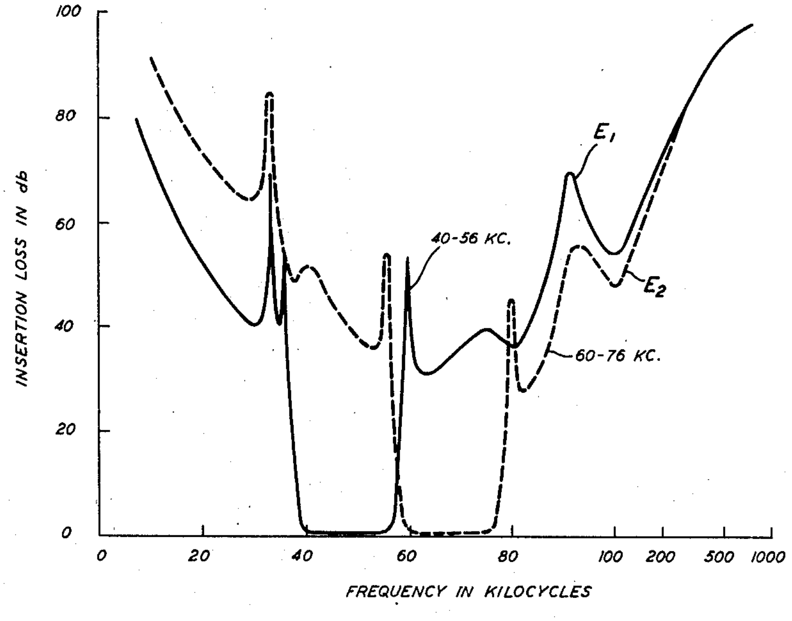
Fig. 7B shows the corresponding frequency characteristic.

The directional filter 33 consists of two band filters, one section passing the high group frequencies and the other section the low group frequencies (see Fig. 7A). In this manner, the two directions of transmission on the line are separated from each other.

*Group receiving circuit*

The group receiving circuit (Figs. 3B and 5B) 14 performs several functions with respect to the incoming line frequencies from the distant terminal A′ (not shown). After the directional filter 33 separates the low level incoming line frequencies, for example, 40–56 kilocycles for LGT or 60–76 kilocycles for HGT, they are amplified and group modulated to the frequency range of the channel band filters, namely, 180–196 kilocycles. In addition, the flat gain supplied is automatically controlled to compensate for changing weather conditions along the line.

The auxiliary band filter 34 supplements the receiving side of the directional filter 33 by providing additional attenuation outside the pass band.

*Regulating amplifier*

The regulating amplifier 36, which has double triode 407A tubes, is operated as a two-stage resistance coupled variable gain amplifier whose gain is inversely proportional to its input level. The gain control is obtained by amplifying and rectifying a portion of the group receiving circuit output, comparing it to a direct-current reference voltage, and applying the resultant voltage as bias to the grids of both stages of the regulator. Regulation is obtained as follows: an increase in signal input to the amplifier increases the output, which results in more direct-current output of the rectifier 67. This makes the bias on the grids of the regulating amplifier 36 more negative, reducing the regulator gain and restoring the output of the amplifier close to its former value. A decrease in input will result in the opposite effect; therefore, the regulating amplifier tends to maintain a fixed output and, consequently, a fairly constant level at the modulator input. The time constant of the regulator is controlled by resistor and condensers in the well-known manner.

*Receiving group modulator*

The receiving group modulator 35 shifts the line frequencies 40–56 kilocycles (low group receiving) and 60–76 kilocycles (high group receiving) to the 180–196 kilocycle band. It is a double balanced bridge of copper oxide varistors to which a carrier of 256 kilocycles is supplied by a crystal controlled oscillator. The balanced condition provides suppression for both the applied carrier and the input band, which accordingly do not appear in the output thereof.

The wanted sideband (180–196 kilocycles) from the modulator output is passed by the receiving group band filter 39 and amplified by a two-stage feedback amplifier 38.

The output of the amplifier 38, which also represents the group receiving circuit output, is fed to the high impedance inputs of the two twin-channel circuits 10′, 11′.

*Twin-channel carrier circuits*

Each twin-channel carrier circuit performs four functions. On the transmitting side, it supplies the common carrier (184–192 kilocycles) to the modulators 28 of two channels; also the same carrier is supplied to the combining multiple for eventual transmission over the line.

On the receiving side, it selects the complementary incoming common carrier and amplifies it for supplying the associated demodulators and at the same time provides a nearly constant output level of the associated sidebands, thus supplementing the regulation of the group receiving circuit. These functions are carried out at the channel frequencies, 180–196 kilocycles. The two twin-channel carrier circuits are interposed between the carrier frequency sub-assembly on one side and the group transmitting and group receiving circuits on the other side.

The group receiving circuit regulates the four incoming channels as a group. The control circuit is flat, and the total power output is about +9 decibels per minute. However, one carrier, and consequently its two associated channels, may be several decibels lower in level than the other carrier and its two associated channels because of slope of the line attenuation characteristic across the band. Because of changing weather conditions, this difference between the two pairs changes. The twin-channel carrier circuits practically remove this changing difference by regulating each carrier and its associated pair of channels to an approximately constant output.

The receiving side of the twin-channel carrier circuit consists of a variable gain amplifier 68 and its control circuit 69. The variable gain amplifier inputs of the two twin-channel circuits are connected in parallel to the output of the group receiving circuit so that both carriers and all four channels are present in both twin-channel circuits. A crystal band filter 70 bridged at the output of the amplifier 68 picks off one of the carriers associated with one pair of channels and applies it to a control circuit which regulates the amplifier gain to hold that particular carrier constant at the amplifier output. The gain of the amplifier for the associated pair of twin-channel sideband frequencies is thus controlled at the same time.

*Channel demodulator*

The demodulator circuit consists of the following: the receiving channel band filter 40 which selects one channel sideband and rejects the other three; a shunt-type balanced varistor demodulator 41 where the message and signaling sidebands are demodulated against the carrier to voice frequency; and an amplifier 72 with a gain control potentiometer (R) at its input for amplifying the voice frequencies received from the modulator before transmitting them to the input of the expandor and 3700-cycle signal detector circuits. The demodulator amplifier 72 has about 28 decibels gain and feedback is provided for stability.

The demodulator operates with either 184 kilocycles or 192 kilocycles, which is selected by a carrier pick-off filter 70 in the twin-channel circuit, amplified, and fed to the demodulator over a pair of leads 73 separated from those through which the sideband energy is transmitted.

*Expandor circuit*

The expandor circuit receives compressed speech signals from the demodulator amplifier 79 and restores their original incompressed range of volumes at its output.

The expandor circuit (see Fig. 5A) consists of the receiving low pass filter 75 which passes speech frequencies up to 3100 cycles and rejects 3700-cycle signaling tone and adjacent channel components, the variolosser 76, and control circuit 77 which effect 2:1 volume expansion of the speech signals to restore their original volume range, and an output amplifier which provides sufficient gain to operate at a desired output level.

Speech energy is applied to the control amplifier, and the amplified signals are then rectified by a full wave germanium rectifier. The resulting direct current, as in the case of the compressor circuit, is proportional to the speech amplitude and is passed through the variolosser 76 to control its loss and provide the 2:1 expansion ratio. Both the compressor and expandor are disclosed in greater detail in the aforementioned United States application of R. S. Caruthers, Serial No. 176,037, filed July 26, 1950.

*Signaling receiver*

The signaling receiver circuit, Fig. 5A, receives supervisory and dialing information from the channel demodulator amplifier 72 in the form of pulses of 3700-cycle tone and translates this information into opens and closures on the E lead for supervision or dial pulsing, as is more fully described in the aforementioned Entz et al. application.

The signaling receiver circuit consists first of a 3700-cycle band pass filter 80 to accept a signaling tone and reject speech frequencies. Following the filter is an amplifier 81 with adjustable feedback for controlling operating margin. Next is a limiter-multivibrator 82 which converts the input 3700-cycle sine wave into a 3700-cycle square wave whose amplitude is constant over a wide range of input amplitudes. Following this is a cathode-follower stage 83 which, by virtue of its high input impedance and low output impedance, affords means for interconnecting the high impedance multivibrator to a low impedance voltage doubler rectifier 84 which converts the 3700-cycle square wave into direct current. The direct current from the rectifier is transmitted through a resistance-capacitance delay network 85 which passes desired supervisory signals and dial pulses while rejecting comparatively short duration noise bursts and line transients. The direct-current signals from the delay circuit are applied to the grid of a direct-current amplifier with a sealed mercury contact polarized relay 86 in its plate circuit. The direct-current amplifier 87 is biased beyond cut-off so that with no 3700-cycle input to the circuit, the relay is held in the non-operated condition by action of steady current in its biasing winding so that the E lead to the switchboard is closed through the relay back contacts. When 3700-cycle tone is applied, the direct-current amplifier conducts, and its plate current operates the relay to open the E lead.

Fig. 6A shows a channel band filter for the carrier terminals. The channel filter 29 employs a high Q crystal element such as quartz or the like, high Q ferrite core inductors and condensers to secure very sharp frequency discrimination in filtering. The specific filtering performance characteristics of two adjacent channel filters is shown in Fig. 6B. In one embodiment, ferrite with a Q of 600 was used for the filter. It should be appreciated that ferrite, as used herein, could be applied to different frequency ranges, such as radio and the like.

Fig. 7A shows the directional filter which separates the two directions of transmission on the line. It consists of two band filters 80, 81 formed of coil condenser combinations, the filters being connected, respectively, in parallel with respect to an input source. One filter 80 passes the low group 40–56 kilocycles per second, and the other 81 passes the high group 60–76 kilocycles per second. All the coils of both filters have high Q ferrite cores of the type previously described to provide the requisite steepness in the frequency band characteristic disclosed in Fig. 7B. The transmission distortion within the pass band is appreciably reduced by ferrite enabling more filters to be used in tandem and dispensing with special equalizers.

The frequency characteristic of the 40–56 kilocycles per second filter 80 is shown by the full line curve, and the corresponding characteristic for the filter 81 is shown by the dotted curve. It should be apparent from the steepness of the filter characteristics shown that the four channel groups are effectively separated. The built-in compandors render the non-linearity effects of the ferrite filters 80, 81 tolerable. The compandor advantage of 25 decibels permits a greater production of modulation effects in the ferrite filters than would be permissible without the use of the compandor. Modulation cross-talk originating in the non-linear ferrite is rendered tolerable by the compandor advantage in the manner generally disclosed in the aforementioned Caruthers applications. The ferrite filters provide a saving of frequency space by reducing the necessary band width required for separating the different groups. Use of band filters as directional filters permits use of opposite directional groups on the same pair only four kilocycles apart. Ferrite coils used in the band filters provide exceptionally flat transmission bands. Use of band filters as directional filters is made possible in accordance with the system of this invention through use of ferrite coils and the close compacting of channels through twin-channel operation. In one practical embodiment, sufficient frequency space was saved to permit the addition of a block of four channels on the line.

While certain frequency ranges have been specified heretofore in the disclosure, it should be understood that such was by way of example rather than limitation.

The invention described may be applied to a multichannel cable carrier system as disclosed in the aforementioned Caruthers applications using the same frequency space and line facilities with a doubling of the number of channels. Likewise, it could be applied to coaxial cable transmission or radio propagation by utilizing the basic terminal group and then group modulating to the desired frequency range.

While there have been described what are considered to be the preferred embodiments of this invention, it will be obvious to those skilled in the art that various changes and modifications may be made therein without departing from the spirit of the invention.

What is claimed is:

1. A two-way multichannel carrier system comprising carrier terminals, spaced repeater sattions and open-wire lines connecting said repeaters and terminals together, the opposite directions of transmission being characterized by high and low frequency bands, respectively, said repeaters each including a group modulator for interchanging the high and low bands in their passage through a repeater, said carrier terminals providing a pair of channels comprising the upper and lower sideband, respectively, of a single carrier modulated by different signals, and a compandor for each channel adapted to relax the linear and non-linear performance requirements of said system components an amount corresponding to the compandor advantage in decibels.

2. A multichannel carrier system comprising carrier terminals having four channel transceiver units, spaced repeater stations and a transmission line therefor, said four-channel units including a pair of twin channels in closest proximity to each other in the frequency spectrum, each twin channel comprising the upper and lower sideband, respectively, of a common carrier modulated by different subscribers' signals, a bandpass filter for passing the four-channel group in one direction to said transmission line, said filter including a magnetic core impedance and a compandor connected to each channel adapted to render the non-linearity of said filter tolerable.

3. The structure of claim 2, wherein said repeaters include frequency interchange amplifiers, said repeaters having group modulators therein, whereby the input and output frequency bands are interchanged.

4. The structure of claim 3, and a common oscillator connected to said modulator for inverting the order of said channels in their passage through said repeater.

5. A two-way multichannel carrier wave system comprising carrier terminals connected to a pair of wires constituting a transmission line, means for producing broad high and low frequency bands of equal width for transmission along said line in opposite directions, channel units in each terminal for providing a single carrier and two sidebands, each sideband representing a separate subscriber's signals, each broad band comprising plural carriers and their corresponding sidebands sequentially allocated thereto, and a receiver in each terminal having a frequency converter therein adapted to convert one band into the other, and a compandor in each channel unit adapted to relax the performance requirements of linear and non-linear components of said system an amount corresponding to the compandor advantage.

6. A telephone system comprising a voice input circuit at one terminal, a voice output circuit at another terminal, and an interconnecting open-wire line including a sucession of transmission devices, certain of said devices comprising amplifying means, a volume compressor in said input circuit, a volume expandor in said output circuit, said terminals including a pair of twin channels in closest proximity to each other in the frequency spectrum, each twin channel comprising the upper and lower single sidebands, respectively, of a common carrier modulated by different subscribers' signals, bandpass filters having ferrite reactors for passing a four-channel group in one direction, each of said transmission devices having its permissible intermodulation level increased an amount corresponding to the compandor advantage in decibels.

7. A telephone system according to claim 6, and including a carrier terminal for said line, said volume compressor being connected to a channel modulator for modulating said voice currents onto a carrier wave, means to apply said modulated waves to said line for transmission to the other terminal, and a common regulator for said twin channels.

8. The structure of claim 7, and repeaters containing a group frequency modulator therein for interchanging the input and output bands of said repeaters, each of said group modulators constituting one of said transmission devices.

9. The structure of claim 8, wherein a filter having magnetic core reactors is contained in each repeater, each of said filters constituting one of said transmission devices.

10. A telephone system comprising a voice input circuit at one station including a volume compressor, a voice output circuit at another station including a volume expandor, said compressor and expandor constituting a compandor providing an interference level advantage of *n* decibels, an open-wire line interconnecting said stations, means for producing, respectively, at each station an upper and lower sideband of a common carrier modulated by separate signals, filters having non-linear elements for passing said sidebands, said non-linear elements having the allowable upper limit of interference energy which they may contribute raised *n* decibels corresponding to said compandor advantage.

11. The structure of claim 10, and a plurality of repeaters connected to said line at spaced points thereof, each repeater having non-linear components therein whose performance requirements are relaxed an amount in decibels corresponding to said compandor advantage.

12. The structure of claim 11, wherein one of said repeater components is an amplifier.

13. The structure of claim 12, wherein one of said repeater components is a modulator.

14. A multichannel carrier system comprising terminal stations and repeater stations, said terminal stations including built-in compandors for each channel, each compandor providing a predetermined decibel advantage *n* in the signal-to-noise ratio, a carrier transmission medium connecting said stations together, said repeater stations being supplied with non-overlapping frequency bands of equal width, said bands comprising a sequential arrangement of single sidebands corresponding to separate subscribers' signals, and a carrier frequency common thereto, a group modulator in each repeater station for interchanging said bands, and ferrite filters connected to the input and output of said modulator, said repeaters being operated at higher output levels permitting *n* decibels greater production therein of modulation effects than would be permissible without the use of said compandors.

15. A terminal for a multichannel carrier system comprising a plurality of voice circuit each including a compandor providing an advantage of *n* decibels, means for producing upper and lower sidebands, respectively, of a common carrier modulated by separate voice signals, filters having ferrite coils for passing said sidebands, said filters having an allowable upper limit of interference energy which they may contribute raised *n* decibels corresponding to said compandor advantage and a group modulator for shifting said sidebands in the frequency spectrum and having its permissible intermodulation level increased an amount corresponding to said compandor advantage in decibels.

16. A terminal for a multichannel carrier system comprising voice input circuits, compressors connected thereto, a pair of twin channel circuits in close proximity to each other in the frequency spectrum, each twin channel comprising the upper and lower sidebands, respectively, of a common carrier modulated by different voice signals, band pass filters having non-linear reactances for passing a four-channel group in one direction, twin channel receiving circuits for modulating voice signals propagating from the opposite direction, band filters having high quality factor, magnetic core reactances for segregating each channel of a twin, and expandors connected to each receiving circuit.

17. The structure of claim 16, and a combining multiple for inserting the common carrier into the frequency band of its associated channels.

18. The structure of claim 16, and individual twin channel regulators connected to said twin receiving circuits.

19. A multichannel carrier system comprising repeaters and terminals, each terminal having individual voice input circuits, a compressor connected to each voice circuit, modulators and filters connected to said compressors for deriving twin channels in close proximity to each other in the frequency spectrum, said filters including non-linear reactances having a quality factor in the range of 500–1000, a carrier oscillator and a combining multiple circuit for said carrier and twin channel frequencies, and expandors in each terminal having varilossers providing a decibel advantage to increase the permissible intermodulation level an amount corresponding to said advantage.

20. A multichannel carrier system comprising terminals each having a pair of voice circuit channels, a compressor for each voice circuit, a modulator connected to each voice circuit, a common carrier source connected to each modulator, a band pass filter connected to each modulator, one filter passing only the lower sideband and the other the upper sideband, each filter having high quality factor nonlinear reactance therein, and a combining multiple connected to said source and filters, respectively, repeaters connected between said terminals, and an expandor for each voice circuit at a distant terminal for reducing distortion introduced by interchannel modulation.

21. A multichannel carrier system comprising terminals having non-overlapping bands of transmission and reception, each comprising a pair of twin channels therein, each twin channel comprising a carrier and sidebands on opposite sides thereof, each sideband corresponding to a separate signal, a band pass filter having high quality factor non-linear reactances for passing said bands, a compandor in each channel adapted to provide an advantage *n* in decibels, and frequency interchange repeaters connected between said terminals adapted to interchange the incoming and outgoing bands of frequencies.

22. The structure of claim 21, said repeaters having means for inverting the channel order and a group modulator adapted to maintain the twin channels with respect to their common carriers invariant in their transmission through the system.

23. A two-way multichannel carrier system comprising carrier terminals, spaced repeater stations, and pairs connecting said repeaters and terminals together, the opposite directions of transmission in said system being provided by high and low frequency bands respectively, means at the terminals for generating a pair of channels comprising the single sidebands of a common carrier modulated by different signals, respectively, and a common regulator for said pair of channels, and group filters at each repeater, said filters having non-linear impedance elements therein, and a compandor for each channel having a decibel advantage *n* for reducing the permissible intermodulation derived from said non-linearity.

24. A multichannel carrier system comprising sequential arrays of contiguous twin channels forming non-overlapping bands, each twin channel comprising an upper and lower sideband of a common carrier representing different signals, filters having non-linear ferrite cores and quartz crystals for segregating said sidebands, an open wire line, directional band pass filters connected thereto and having non-linear core reactors of high quality factor for separating the two directions of transmission, and compandors connected to said twin channels for reducing intermodulation in said system.

25. The structure of claim 23, and a group modulator for interchanging said non-overlapping bands and group filters containing high quality ferrite core coils for passing said bands.

26. A multichannel carrier system comprising an even number of line sections for transmitting high and low frequency bands in opposite directions, spaced two-way repeaters connected to said lines, said bands comprising a sequential arrangement of carrier frequencies and pairs of single sideband channels corresponding to separate subscribers' signals, each repeater including a group modulator and fixed frequency oscillator for interchanging said high and low frequency bands and for inverting the sequential order of channels to provide a constant loss over a four channel group comprising said sidebands, and group filters containing ferrite core coils for passing said bands, and a built-in compandor for each channel providing a decibel advantage *n*, whereby the intermodulation requirements of said filters are relaxed a corresponding amount.

27. A multichannel carrier system comprising terminal stations and repeater stations, said repeaters amplifying groups comprising non-overlapping frequency bands including sequentially allocated carriers and sidebands individual thereto constituting twin channels corresponding to different subscribers' signals and each twin channel having a common carrier respectively, a group regulator at said repeater and subgroup regulators in said terminals, each subgroup regulator being operated by the carrier common to its twin channel, a built-in compandor for each channel, said repeaters being operated at higher output levels corresponding to the compandor advantage in decibels.

28. The structure of claim 27, wherein each repeater is provided with a frequency converter for interchanging the groups in their passage therethrough.

References Cited in the file of this patent

UNITED STATES PATENTS

| Number | Name | Date |
|---|---|---|
| 1,498,568 | Osborne | June 24, 1924 |
| 1,607,682 | Martin | Nov. 23, 1926 |
| 2,009,438 | Dudley | July 30, 1935 |
| 2,248,757 | Herold | July 8, 1941 |
| 2,300,415 | Green | Nov. 3, 1942 |
| 2,328,450 | Hagen | Aug. 31, 1943 |
| 2,623,169 | Gardere | Dec. 23, 1952 |